United States Patent
Ozaki et al.

(10) Patent No.: US 7,419,052 B2
(45) Date of Patent: Sep. 2, 2008

(54) CONVEYOR CHAIN

(75) Inventors: Hajime Ozaki, Osaka (JP); Katsutoshi Shibayama, Osaka (JP); Yoshihiro Murakami, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/405,868

(22) Filed: Apr. 18, 2006

(65) Prior Publication Data

US 2006/0260917 A1 Nov. 23, 2006

(30) Foreign Application Priority Data

May 23, 2005 (JP) .............................. 2005-150034

(51) Int. Cl.
*B65G 17/06* (2006.01)
*B65G 17/38* (2006.01)

(52) U.S. Cl. ....................... 198/853; 198/850; 198/851; 198/852

(58) Field of Classification Search ................. 198/850, 198/851, 852, 853
See application file for complete search history.

(56) References Cited

U.S. PATENT DOCUMENTS

| 5,573,105 | A | 11/1996 | Palmaer | |
|---|---|---|---|---|
| 5,954,190 | A * | 9/1999 | Takahashi et al. | 198/853 |
| 6,068,112 | A * | 5/2000 | Kasai et al. | 198/853 |
| 6,189,686 | B1 * | 2/2001 | Shibayama et al. | 198/853 |
| 6,209,714 | B1 * | 4/2001 | Lapeyre et al. | 198/779 |
| 6,244,426 | B1 * | 6/2001 | Murano et al. | 198/784 |
| 6,318,544 | B1 * | 11/2001 | O'Connor et al. | 198/853 |
| 6,494,312 | B2 * | 12/2002 | Costanzo | 198/779 |
| 6,525,137 | B1 | 2/2003 | Alex | |
| 2001/0045346 | A1 | 11/2001 | Costanzo | |
| 2002/0060142 | A1 * | 5/2002 | Morimoto et al. | 198/851 |
| 2004/0129538 | A1 | 7/2004 | Corley | |
| 2006/0054470 | A1 * | 3/2006 | Ozaki et al. | 198/850 |

FOREIGN PATENT DOCUMENTS

| EP | 1 591 383 | 11/2005 |
|---|---|---|
| JP | 2003-182829 | 7/2003 |
| WO | WO 94/03383 | 2/1994 |
| WO | 2004/078619 | 9/2004 |

* cited by examiner

*Primary Examiner*—Gene O. Crawford
*Assistant Examiner*—Ramya G Prakasam
(74) *Attorney, Agent, or Firm*—Dann, Dorfman, Herrell and Skillman, P.C.; Henry H. Skillman

(57) ABSTRACT

Conveyor chains are provided which comprise free balls which are free to rotate in all directions thereby allowing for the stable conveyance of articles in any direction in the entire horizontal plane and at an increased speed in the direction of conveyance with reduced contamination in the conveyance environment. A conveyor chain 100 comprises a number of chain links 110 comprising a plurality of hinge portions 112 in a zigzag formation protruding from the front and rear end edges that are connected to each other in the longitudinal direction of the chain through hinge pins 120. Free balls 131 protrude from both the surface and back sides of the chain link 110 and are free to rotate while held in the chain link 110. Either the free balls 131 or ball holding portions 132, which hold the free balls 131, is made of polyacetal while the other is made of polyamide or polyester.

6 Claims, 5 Drawing Sheets

CONVEYOR CHAIN

This application claims priority under 35 U.S.C. §119(a) to Japanese Patent Application 2005-150034, filed May 23, 2005. The foregoing application is incorporated by reference herein.

FIELD OF INVENTION

The present invention relates to conveyor chains suitable for loading and conveying articles having a flat bottom surface (e.g., box-shaped articles, plate-shaped articles, and the like). More specifically, the present invention relates to a conveyor chain comprising free balls which protrude from both the surface and back sides of the chain link.

BACKGROUND OF THE INVENTION

Conveyor belts for the conveyance of articles may comprise balls or rollers which can rotate. The articles can be quickly sorted during conveyance on such conveyor belts as they can be unloaded while being slid to a side of the conveyance line (see Japanese Laid-Open Patent Publication No. 2003-182829).

In such a conveyor belt, the belt module comprises vertically laminated first and second members. The conveyor belt is formed by connecting hinge portions formed in the first and second members of the modules by the use of hinge pins. Between the first and second members are balls or rollers which can rotate and allow for the articles to be discharged by sliding to a side of the conveying line.

However, the above-mentioned conventional conveyor belts comprise belt modules formed by vertically integrated first and second members wherein the balls are sandwiched between the first and second members. This formation causes sliding wear between the belt module and the balls.

Further, such conveyor belts comprise a belt module and balls that are made of polyacetal, which has excellent self-lubricating property so as to suppress sliding wear. Because the materials of the belt module and the ball are the same, however, the contact surfaces between the belt module and ball have high affinity and are likely to adhere to each other, thereby resulting in increased sliding wear.

Therefore, the above described belts have problems with accelerated wear. Further, a backlash in the conveyor belt or a change in the conveying level can occur due to the extra wear, whereby articles loaded on the balls of the belt cannot be conveyed stably. Additionally, the sliding wear will lead to the contamination of the conveyance environment with the powder and dust generated by the sliding wear.

SUMMARY OF THE INVENTION

In accordance with the instant invention, conveyor chains are provided which solve the above-mentioned problems. In accordance with one aspect of the instant invention, the conveyor chain of the instant invention comprises a number of chain links comprising a plurality of hinge portions in a zigzag formation which protrude from the front end and rear end edges. The chain links are connected to each other in the longitudinal direction of the chain through hinge pins. Free balls protrude from both the surface and back sides of the chain link, are held in the chain link, and are free to rotate. Furthermore, either the free ball or the ball holding retainer portion is made of polyacetal while the other component is made of polyamide or polyester.

In a particular embodiment of the invention, the ball holding retainer portions are removable from the chain link.

In yet another embodiment of the instant invention, the ball receiving surface of the ball holding portion includes a plurality of ribs or grooves.

DETAILED DESCRIPTION OF THE INVENTION

Figure 1:
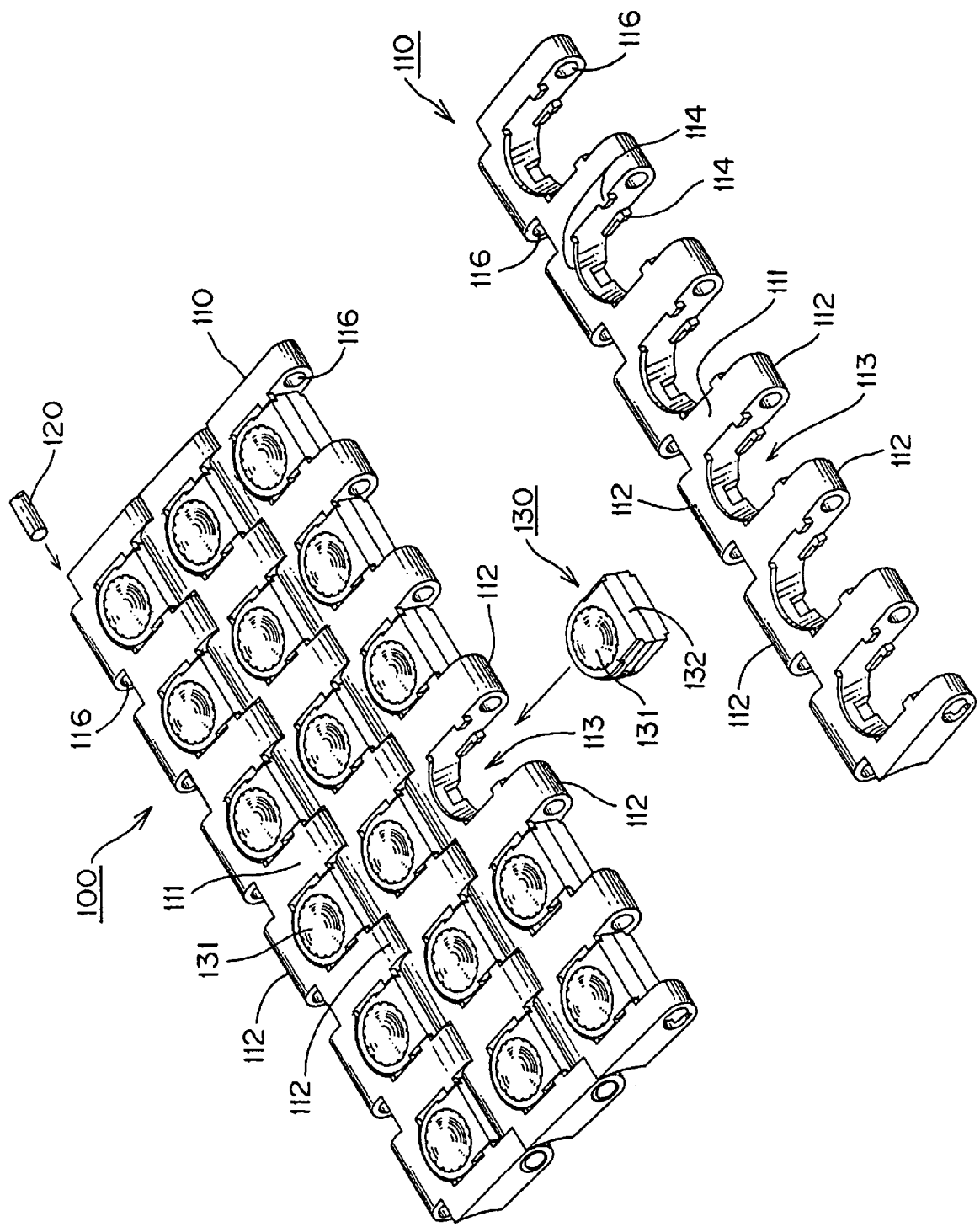
FIG. 1 is a schematic explanatory view of a part of a conveyor chain which is a first example according to the present invention.

The present invention is made to solve the above-mentioned problems associated with the belts of the prior art. More specifically, it is the object of the present invention to provide a conveyor chain which 1) allows for the conveyance of articles in any direction in the entire horizontal plane (i.e., 360 degrees) by balls held in the conveyor chain such that they are free to rotate, 2) allows for articles to be conveyed more quickly in the direction of conveyance (e.g., twice as fast), and 3) reduces the wear of the free ball and the ball holding portion so as to allow for the stable conveyance of articles while suppressing the contamination of the conveyance environment with powder and dust generated by sliding wear.

In an exemplary conveyor chain of the invention, a number of chain links are connected to each other through hinge pins in the longitudinal direction of the chain. Articles having a flat bottom surface (e.g., box-shaped, plate-shaped and the like) can be conveyed by their contact with the free-balls of the conveyor chain which protrude from both the surface and back sides of the chain links. The free balls can rotate freely such that the conveyor chain exhibits a conveyance direction conversion function and a double speed function. The articles can be moved in any direction in the entire horizontal plane (i.e., in 360 degrees).

Furthermore, any one of the free ball and the ball holding retainer portion is made of polyacetal and the other is made of polyamide or polyester in order to suppress the wear of the free ball and ball holding retainer portion. Notably, polyacetal, polyamide, and polyester possess excellent self-lubricating properties. Additionally, the wear coefficient between different materials is less than that between the same materials. Therefore, the sliding wear between the free ball and the ball holding retainer portion in the chain of the instant invention is reduced.

Due to the reduced sliding wear, a change in the diameter of the free ball or the ball holding retainer portion due to wear is lessened. Further, by reducing wear, a break or deformation of a bottom portion of a conveyance article can be prevented and a change in the conveyance level suppressed such that a stable conveyance can occur.

Additionally, since the wear of the free ball and the ball holding retainer portion is suppressed, the generation of wear powder is reduced, thereby allowing the conveyance environment to remain clean.

The ball holding retainer portions can be removably mounted in the chain link. Accordingly, the ball unit can be easily mounted in a chain link and removed and replaced if the ball holding retainer portion or the free ball is worn or damaged. As such, maintenance of the conveyor chain is facilitated.

In accordance with one embodiment of the invention, the ball receiving surface of the ball holding retainer portion includes a plurality of ribs or grooves. These ribs or grooves allow for the discharge of wear powder and dust from between the ribs and from grooves such that rotation failure of the balls and partial wear due to the rotation failure is suppressed and the rotation of the free balls is smooth. As a result stable conveyance is further facilitated.

An exemplary conveyor chain of the present invention comprises a number of chain links comprising a plurality of hinge portions in a zigzag formation which protrude from the front and rear end edges. The chain links are connected to each other in the longitudinal direction of the chain through hinge pins. The chain link further comprises free balls protruding from both surface and back sides which are free to rotate. Either the free ball or the ball holding retainer portion, which holds the free ball, is made of polyacetal and the other is made of polyamide or polyester. The free balls held by the conveyor chain allow for the conveyance of articles in all directions in the entire horizontal plane (e.g., all 360 degrees) and at an increased speed in the direction of conveyance. The wear of the free ball and the ball holding portion is suppressed so that a stable conveyance is facilitated. Any embodiment of this conveyor chain is encompassed by the instant invention.

Notably, the chain link used in the conveyor chain of the present invention may have any link width in accordance with the width of the conveyance line. Furthermore, the size of the loadable portion, the size of the protruding portion of a hinge portion and the like may be adapted appropriately, e.g., in accordance with the chain pitch and other characteristics of the chain link.

Furthermore, any number of free balls can be mounted in the conveyor chain. However, it is preferred that the free balls are placed at about 500 to 3000/m$^2$ such that the load on any one ball is small. The reduction of the load on any one ball reduces the wear of the ball and any deformation in the diameter of the ball such that breakage and deformation of the bottom portion of the conveyance article can be prevented and stable conveyance can be facilitated.

As stated hereinabove, when either the free ball or the ball holding retainer portion is made of polyacetal, the other is made of polyamide or polyester. The polyacetal may be a homopolymer, copolymer, or block copolymer. Exemplary polyamides include, without limitation, nylon 6, nylon 66, and the like. Exemplary polyesters include, without limitation, polyethylene terephthalate (PET), polybutylene terephthalate (PBT), and the like.

The ball holding portion of the conveyor chain of the instant invention, may be formed integrally within the chain link or may be separately formed as a removable unit. In a preferred embodiment, the ball unit comprises a ball holding member (e.g., a retainer) which is removably formed in the chain link. The removable ball units allow for the easy mounting of the ball unit onto the chain link and allow for the easy removal and replacement of a worn or damaged ball unit. Thus, the maintenance of the conveyor chain of the present invention is simplified and the material of the chain link can be freely selected.

The ball unit of the conveyor chain may adopt any unit form. Preferably, the ball unit allows for the free ball to protrude from both the surface and back sides of a chain link and allows the free ball to freely rotate. In a particular embodiment, the free ball is sandwiched between a pair of upper and lower retainer elements which are vertically symmetrical. By using such vertically symmetrical retainers, the ball unit can be vertically randomly mounted in the chain link allowing for the efficient mounting of the ball unit.

EXAMPLE 1

A first exemplary conveyor chain of the instant invention is described hereinbelow with reference to FIGS. 1 to 4.

Figure 2:
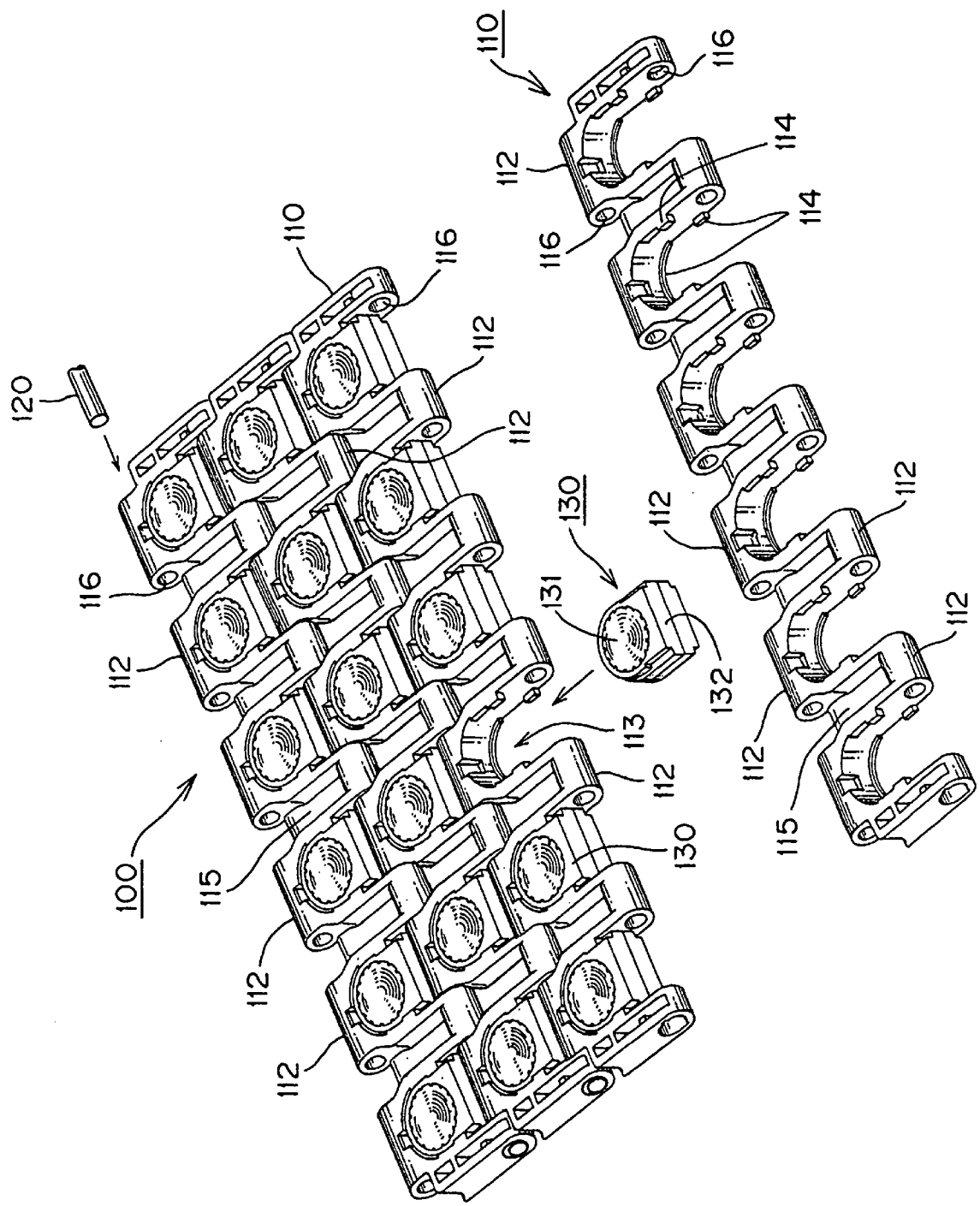
FIG. 2 is a perspective view viewed from the back side of the conveyor chain shown in FIG. 1.
Figure 3:
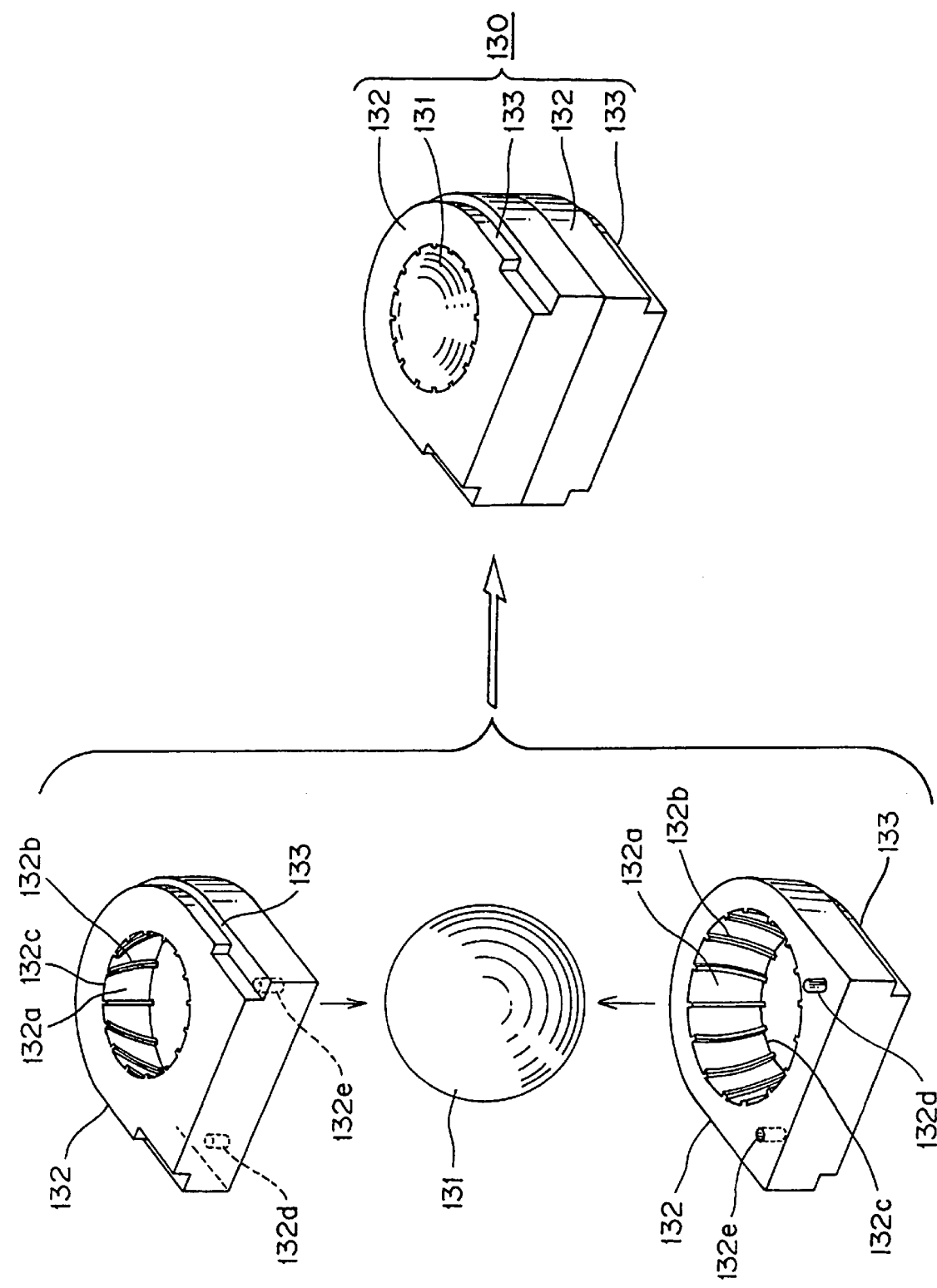
FIG. 3 is an exploded assembly view of a ball unit.
Figure 4:
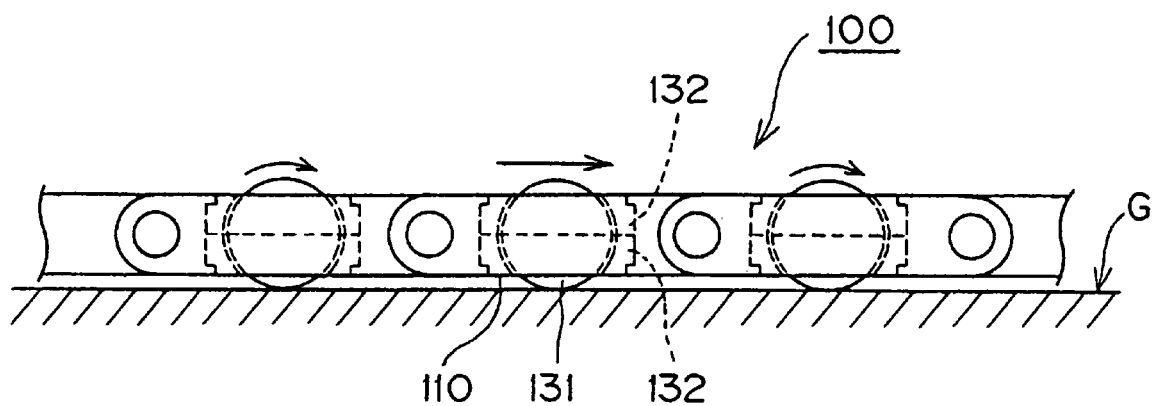
FIG. 4 is an explanatory view showing an operation state of the conveyor chain.

FIG. 1 is a schematic explanatory view of a part of a conveyor chain of the present example viewed from the surface side. FIG. 2 is a perspective view the conveyor chain of FIG. 1 viewed from the back surface side of the chain link. FIG. 3 shows the components of the ball unit assembly. FIG. 4 is an explanatory view showing an operation state of the conveyor chain.

A conveyor chain 100 of the present example, as shown in FIG. 1, comprises a number of chain links 110 longitudinally connected to each other by the insertion of the hinge pins 120 into pin holes 116 provided in hinge portions 112. A free ball 131 in a ball unit 130 is mounted into a unit mounting region 113 formed in the chain link. The free balls 131 are held by the chain links 110 and articles (e.g., box-shaped, plate-shaped, and the like) are conveyed by being loaded on the free balls 131.

It is noted that although in the present example a chain width is composed of one chain link, a plurality of rows of chain links, wherein each row has the same link width, may be formed in the chain width direction. Alternatively, chain links having different link widths may be butted against each other in the chain width direction. The chain links may be connected in a bricklaying fashion such that the butted surfaces may not be aligned in the longitudinal direction of the chain.

The chain link 110 comprises a plurality of hinge portions 112 in a zigzag arrangement protruding from the front and rear end edges. U-shaped mounting regions 113 are provided on the article loading side 111 between hinge portions 112, 112 of one edge end. It should be noted that each U-shaped mounting region forms a channel which extends longitudinally of the chain to receive a ball unit 130. A pair of upper and lower locking protruding portions 114, 114 are provided in the U-shaped unit mounting region 113 which lock the mounted ball unit 130, as shown in FIG. 1. During assembly of the chain, the units 130 may be inserted into the channels through the open ends of the channels, and are captured in the channels during assembly by the hinge pins 120. Engagement portions 115 provided on the back side of the chain link engage with a driving sprocket to transmit conveying power as shown in FIG. 2. The chain link is integrally molded of a synthetic resin such as an engineering plastic.

The free ball 131 allows for the conveyance of articles along the conveyer belt. The free ball 131 also allows for the changing of the direction and increasing the speed of article conveyance. The free ball 131 is free to rotate and held by a pair of upper and lower retainers 132, 132 which become ball holding retainer elements. The free ball 131 and the upper and lower retainers 132, 132 form a ball unit 130 as shown in FIG. 3. The free ball 131 is made of polyamide and the pair of upper and lower retainers 132, 132 is made of polyacetal.

Further, the pair of upper and lower retainers 132, 132 is formed in a U-shape and is symmetrical in the upper and lower portions so that it conforms to the U-shaped unit mounting region 113. The upper and lower retainers 132, 132 Comprise semicircular ball receiving surfaces 132a, 132a which hold the free ball 131 and allow the free ball to rotate freely. A plurality of ribs 132b are provided radially on the ball receiving surfaces 132a. Opening portions 132c, 132c the upper and lower retainers 132, 132 allow for the free ball 131 to protrude from both the surface and back surface of the chaim link 110. The upper and lower retainers 132, 132 are integrally molded of polyacetal.

The ribs 132b lessen the contact area between the free ball 131 and the ball receiving surfaces 132a so as to allow the ball to rotate smoothly. The ribs 132b also allow wear powder, dust, and the like to discharge from the surface side and back side openings of docked retainers 132, 132 through concave portions between ribs 132b.

It is noted that the reference numeral 132d in FIG. 3 denotes a positioning protrusion for docking a pair of upper and lower U-shaped retainers 132, 132 and that the reference numeral 132e denotes a blind hole into which an opposed positioning protrusion 132d is fit-inserted when the pair of upper and lower retainers 132, 132 are docked with each other.

Further, each of the pair of upper and lower U-shaped retainers 132, 132 is provided with a U-shaped step portion 133 which engages with each of the pair of upper and lower locking protrusions 114, 114 provided in the chain link 110 when the ball unit 130 is mounted on the unit mounting region 113 from the longitudinal direction of the chain. The mounted ball unit 130 is positioned and fixed in a surface side to back side direction of the chain and the longitudinal direction thereof.

Inasmuch as the free ball 131 is formed of polyamide and the ribs 132b in the ball receiving surfaces 132a are brought into slide-contact with each other, the sliding wear between the free ball 131 and the retainer 132 is reduced. Additionally, since wear powder, dust, and other particles which can inhibit the rotation of the free ball 131 can be discharged, the likelihood that the rotation of the ball will fail and the likelihood of partial wear due to a failure of the ball to freely rotate are reduced. The discharge of impediments also ensures that the rotation of the free ball is smooth in order to ensure stable conveyance.

After the formed ball unit 130 is mounted onto a U-shaped unit mounting region 113 formed in the chain link 110 from the longitudinal direction of the chain as shown in FIGS. 1 and 2, an adjacent chain link 110 is connected to the chain link comprising the ball unit 130 by inserting a hinge pin 120 into a pin hole 116 of the hinge portion 112, thereby assembling the chain.

Inasmuch as the ball unit 130 is engaged with the chain link 110 to be positioned and fixed in the surface side to back side direction of the chain and the longitudinal direction thereof, the mounted ball unit is captured by the hinge pin and cannot be disengaged inadvertently during operation of an assembled chain.

As mentioned above, the ball units 130 mounted in the conveyor chain 100 of the present example allow for the upper portion of the free ball 131 to protrude from the chain link 110. An article having a flat lower surface (e.g., a box, a plate, and the like) loaded on the conveyor chain 100 can be slid by free rotation of the free balls 131 such that the conveyor chain 100 allows for the conveyance of the article in the entire horizontal plane (i.e., in 360 degrees).

Further, as shown in FIG. 4, when a guide plate G is appropriately provided below the conveyor chain 100 and the lower portions of the free balls 131 protruding from the back side of the chain link 110 are adapted to be in contact with the guide plate G, the free balls 131 are rotated in a traveling direction based on the traveling of the conveyor chain 100. Thus, the conveyor chain 100 can exhibit a double speed function in which articles are conveyed at the maximum two-times the chain speed of the guide plate G.

EXAMPLE 2

A second exemplary conveyor chain 200 of the instant invention is described hereinbelow with reference to FIG. 5.

Figure 5:
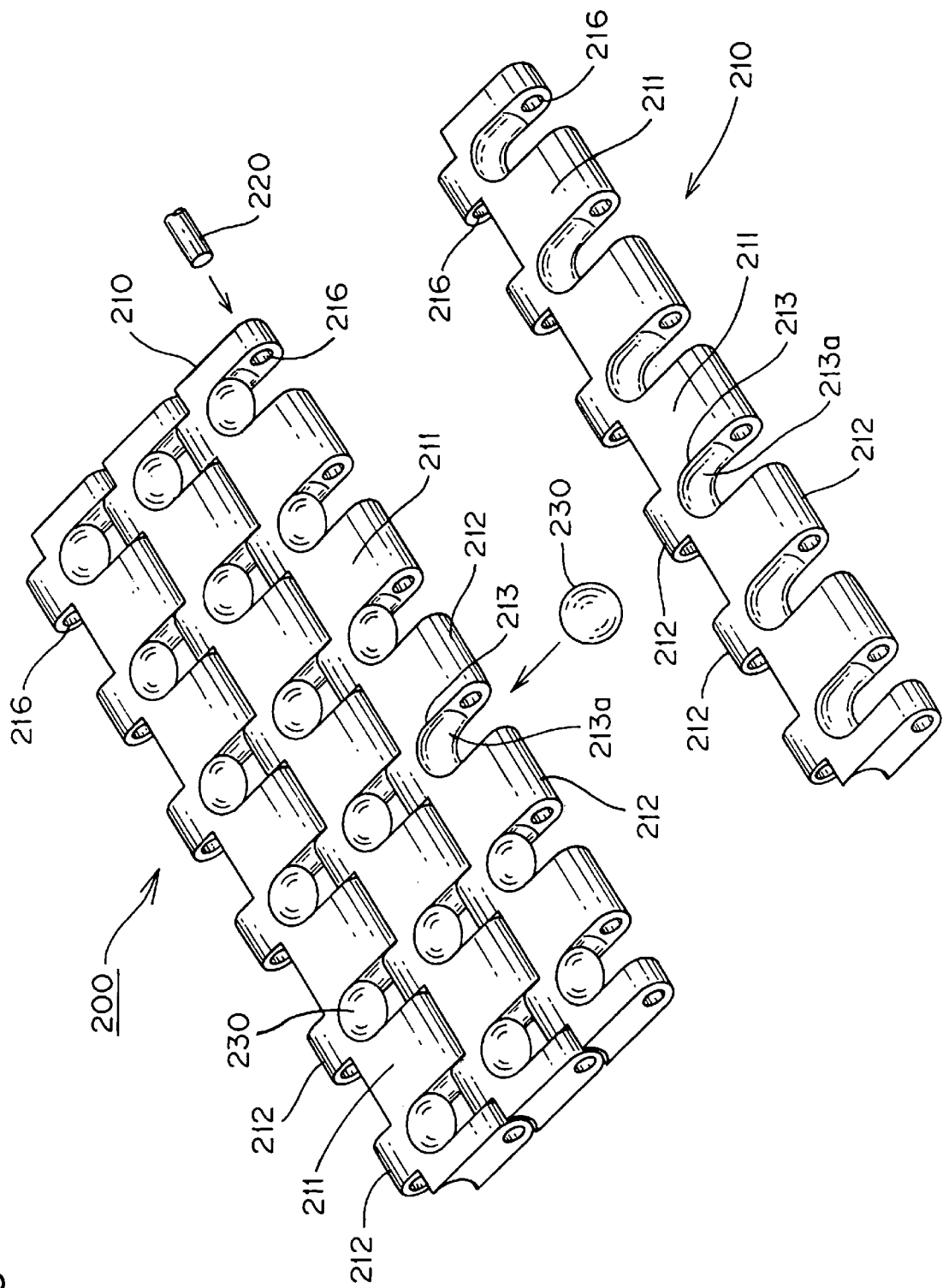
FIG. 5 is a schematic explanatory view of a part of a conveyor chain which is a second example according to the present invention.

FIG. 5 is a schematic explanatory view of a part of the conveyor chain, which is the present example, viewed from the surface side of the chain.

In the conveyor chain 200, ball holding channels 213 are integrally formed within a chain link 210. The chain link is made of polyacetal and the free bail 230 is made of polyamide.

It is noted that the functions of the free ball 230 are substantially the same as those of the free ball 131 of the first example.

As shown in FIG. 5, the conveyor chain 200 comprises a number of chain links 210 which are longitudinally connected to each other by inserting hinge pins 220 into pin holes 216 provided in hinge portions 212. A free ball 230 is held in a ball holding portion 213 formed in the chain link 210.

The chain link 210, as shown in FIG. 5, comprises a plurality of hinge portions 212 in a zigzag formation which protrude from the front and rear end edges. U-shaped ball holding channels 213 are provided on the article loading side 211 between hinge portions 212, 212 of one edge end. The chain links 210 are integrally molded.

Further, on the three inner peripheral surfaces of the U-shaped ball holding channel 213 are formed concave arc-shaped ball receiving grooves 213a, which conform to an outer circumferential surface of the free ball 230 such that the free ball is held, but allowed to freely rotate. The grooves in the opposite walls of the channel form a pair of retainer elements which sandwich the ball therebetween.

Although not shown, it is noted that on the back side the conveyor chain 200, an engagement portion is formed which engages with a driving sprocket to transmit conveying power to the chain, as in the first example.

After a free ball 230 is inserted into a ball holding portion 213 in the chain link 210 from the longitudinal direction of the chain as shown in FIG. 5, an adjacent chain link 210 is connected to the free ball 230. The chain is assembled by the insertion of a hinge pin 220 into a pin hole 216 of the hinge portion 212.

In this case, the free ball 230 is free to rotate in all directions by use of a concave arc-shaped ball receiving surface 213a of the U-shaped ball holding portion 213. The free ball 230 is held so that it protrudes from the surface side and back side of the chain link 210.

Furthermore, disengagement or escape of the held free ball 230 in the longitudinal direction of the chain is prevented by a hinge portion 212 of the adjacent chain link 210.

As mentioned hereinabove, the free ball 230 is made of polyamide and the ball holding portion 213 integrally formed with the chain link 210 is made of polyacetal. As such, the slide wear between the free ball 230 and the ball holding portion 213 is reduced.

Although not shown, it is preferable that a plurality of ribs or groves extending in the surface side to back side direction of the chain along the concave arc-shaped inner peripheral surface may be provided on the ball receiving surface 213a of the present example. The function of the rib or groove is substantially the same as those of the rib or groove of the first example.

Although it is described hereinabove that the free balls 131 and 230 are made of polyamide and that the ball holding portions (retainers) 132 and 213 are made of polyacetal, these polymers are only provided as an example of the possible combination of polymers that can be employed to form the free ball and ball holding portion of the present invention. Thus, the free ball and the ball holding portion can be any combination of polyacetal and polyamide or polyester. For example, the free ball may be polyacetal and the ball holding portion may be polyamide or polyester. As another example, the free ball may be polyester and the ball holding portion may be polyacetal.

As described hereinabove, the free ball protrudes on both the surface and back sides of the chain link of the conveyor chain of the present invention. The free ball is held by the chain link such that it can rotate freely. Either the free ball or the ball holding portion can be made of polyacetal while the other is made of polyamide or polyester. The ability of the free balls held in the conveyor chain to rotate freely in all directions allows for an article to be conveyed in any direction in the entire horizontal plane. Furthermore, the freely rotating balls allow for the articles to be conveyed faster (e.g., at twice the speed). Additionally, the wear of the free ball and the ball holding portion is suppressed in the instant invention and stable conveyance of articles is ensured by the discharge of inhibitory particles. Accordingly, the conveyor chains of the instant invention clearly have superior properties.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

A patent document is cited in the foregoing specification in order to describe the state of the art to which this invention pertains. The entire disclosure of each of this citation is incorporated by reference herein.

What is claimed is:

1. A conveyor chain comprising
a number of chain links including a plurality of hinge portions zigzag protruding from front end edges and rear end edges, adjacent ones of said links being connected to each other in the longitudinal direction of the chain through a hinge pin, and
free ball elements which are free to rotate in any direction protruding from both surface and back sides of said chain,
wherein each of said chain links has a U-shaped mounting region forming a ball-receiving channel extending longitudinally of the chain from the middle of the link through one of said front end edge and rear end edges to provide an open end for said channel in said one end edge, and a pair of ball-holding retainer elements rotatably sandwiching one of said free ball elements therebetween in the channel of one of said mounting regions of said chain links, said channel open end being closed by said hinge pin to capture the ball-holding retainer elements
characterized in that one of said free ball element and said pair of ball holding retainer elements comprising polyacetal and the other comprising polyamide or polyester.

2. The conveyor chain according to claim 1, wherein said pair of ball holding retainer elements are removably mounted through said open end of the channel of the associated chain link, and are captured in said channel by said hinge pin.

3. The conveyor chain according to claim 1, wherein said pair of ball holding elements have ball receiving arcuate surfaces including a plurality of ribs or grooves.

4. A conveyor chain comprising
a number of chain links including a plurality of hinge portions zigzag protruding from front end edges and rear end edges, said links being connected to each other in the longitudinal direction of the chain through hinge pins, and
free ball elements protruding from both surface and back sides of said chain,
wherein each of said chain links has a U-shaped mounting region defining a channel extending longitudinally of said chain and having an open end through one of said front and rear end edges, a pair of retainer elements in said channel, and free ball elements sandwiched between said retainer elements, each ball element being sandwiched between said retainer elements and mounted through said open end in one of said mounting regions of said chain links.

5. A conveyor chain according to claim 4, characterized in that said pair of ball holding elements comprise the side walls of said channel, said balls being removably mounted in said U-shaped mounting region of the associated chain link, and captured in said channels by said hinge pins.

6. The conveyor chain according to claim 4, wherein each ball element is mounted in a pair of ball holding retainer elements removably mounted in said U-shaped mounting region through said open end of the channel, and said free ball element and said pair of ball holding retainer elements are made of different polymers which do not have high affinity to each other.

* * * * *